Oct. 20, 1959   R. J. CUMMINGS ET AL   2,908,991
BOBBER
Filed May 14, 1957
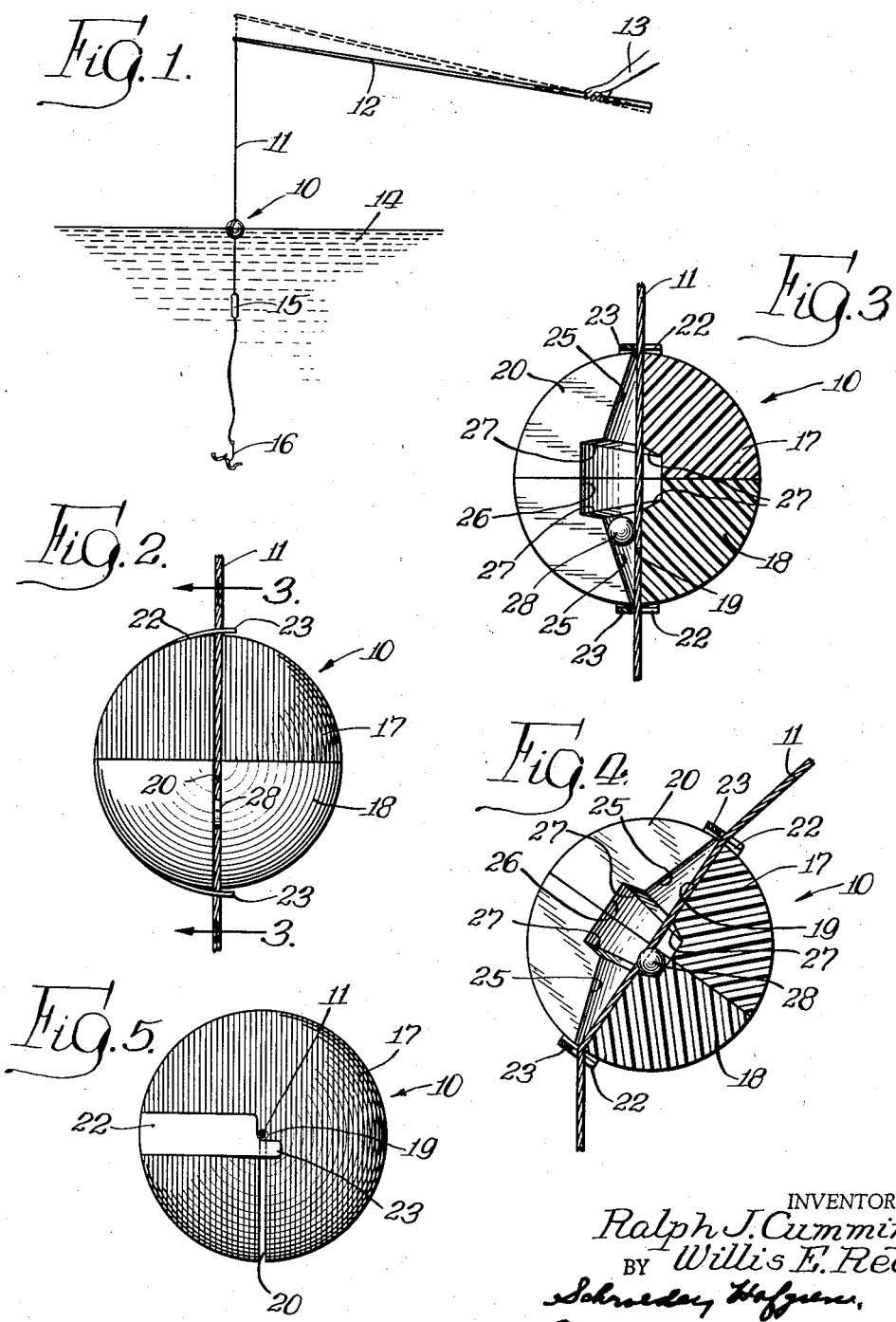
INVENTORS.
Ralph J. Cummings
BY Willis E. Reed,

United States Patent Office 2,908,991
Patented Oct. 20, 1959

2,908,991

BOBBER

Ralph J. Cummings, Berwyn, and Willis E. Reed, Ringwood, Ill., assignors to Willis E. Reed & Co., a partnership composed of Ralph J. Cummings and Willis E. Reed Application May 14, 1957, Serial No. 658,989

2 Claims. (Cl. 43—44.88)

This invention relates to a fish bobber and, more particularly, to a fish bobber of the type wherein the depth of the bait may be controlled by the fisherman by movement of his fishing rod.

Bobbers of this type incorporate many advantages for fishermen and are much in demand. With such a bobber, a fisherman can control the depth of his bait relative to the bobber from his boat or position on shore by merely moving his rod. Another advantage of this type bobber is that it permits the line to slide freely through the bobber when a catch is being reeled in, thus allowing the catch to be netted close to the tip of the rod. With this bobber, a long cast can be made and then, after the bobber has landed in the water, the bait may be lowered to any desired depth. This advantage tends to eliminate fouled up fishing lines and the necessity of standing up in a boat to cast. Additionally, use of this bobber permits casts to be made over submerged and other objects with less chance of snagging the hook during the retrieve of the line inasmuch as the line and hook may be reeled up to the bobber whereupon the bobber may be pulled across the surface of the water.

The main disadvantages with bobbers of this type used in the past is that it was necessary to thread the fishing line through the bobber before attaching the hook and sinker to the line. As it is often necessary to install a bobber on a line after a sinker and a hook have been secured thereto, it was necessary to remove the hook and sinker before attaching the bobbers used in the past.

It is, therefore, the principal object of this invention to provide a new and improved bobber of the type wherein the depth of the bait may be controlled by the fisherman and which eliminates the above mentioned disadvantage by permitting installation of the bobber on a fishing line without threading the line through the bobber.

Another object of this invention is to provide a new and improved fish bobber having means by which a fisherman may adjust the depth of his bait by merely moving his fishing rod and which is easily attachable to a fishing line without the necessity of threading the line through the bobber.

Another object of the invention is to provide such a bobber having a vertical slot extending from the outer surface of the bobber to a passage extending along the vertical axis of the bobber which permits the bobber to be installed on a fishing line and including members extending transversely of the upper and lower ends of the slot for retaining the line within the passage in the bobber.

A more detailed object of the invention is to provide such a slotted fishing bobber having conical recesses formed at the ends of the axial passage for the line with the larger ends of the recesses opening towards each other and toward the central enlarged portion of the passage including a ball adapted to seat itself in either one of the conical recesses to lock the line relative to the bobber when the bobber is in a vertical position and adapted to be disposed within the enlarged portion of the passage when the bobber is tilted to permit the line to pass freely through the bobber.

Other objects and advantages will become apparent from the following detailed description taken in connection with the accompanying drawings, in which:

Fig. 1 is an elevational view showing a fishing rod and line having a preferred embodiment of the bobber of this invention installed thereon;

Fig. 2 is an elevational view of the bobber of Fig. 1 looking toward the slot in the body portion of the bobber;

Fig. 3 is a vertical sectional view taken generally along line 3—3 of Fig. 2 with the bobber in a vertical position and the ball seated in a conical recess whereupon movement of the line relative to the bobber is prevented;

Fig. 4 is a vertical sectional view similar to Fig. 3 showing the bobber in a tilted position wherein the ball is disposed in the enlarged portion of the passage through the bobber to permit free movement of the line through the bobber; and Fig. 5 is a top plan view of the bobber shown in Fig. 2.

While the invention is herein described in a preferred embodiment, it is not intended to limit the invention to the specific form and arrangements shown, it being contemplated that various changes may be made by those skilled in the art without departing from the spirit and scope of the appended claims.

Fig. 1 illustrates the use of a bobber 10 embodying the invention which is shown installed on a fishing line 11 strung on a fishing pole 12 in the hand 13 of a fisherman. As shown in Fig. 1, the bobber 10 is floating upright in a body of water 14 with a sinker 15 and a baited hook 16 being secured to the fishing line 11 below the bobber 10.

The bobber 10 is best shown in Figs. 2 through 5 and may be spherical as shown in the drawing or of a more elongated shape as is often usual with bobbers used in fishing. The bobber 10 includes a body portion having an upper half 17, which may have a red coloration, and a lower half 18, which may have a white coloration, secured together. The fishing line 11 passes through a passage 19 formed in the bobber and extending along the vertical axis thereof when floating in a body of fluid.

A vertically extending slot 20 is formed in the body portion of the bobber 10 and extends from the outer surface of the body portion to the passage 19 through which the fishing line 11 extends. By means of the slot 20, it is very easy to attach the bobber 10 to the fishing line 11 without the necessity of threading the line 11 through the passage 19 in the bobber 10.

In order to provide means to retain the line 11 in the passage 19, members are provided which extend transversely across the upper and lower ends of the slot 20 adjacent the ends of the passage 19 with one end of the transversely extending members being secured to the body portion of the bobber 10 and the other end being spaced sufficiently from the body portion of the bobber 10 to permit the fishing line 11 to be passed between the spaced ends of the transversely extending members to position the line 11 in the passage 19. In the embodiment of the invention shown in the drawings, the means for retaining the line 11 in the passage 19 comprises an elongated member in the form of a substantially semi-cylindrical keeper ring 22 which extends vertically around the surface of the bobber 10 and in a plane normal to the slot 20 formed in the body portion of the bobber 10. As best shown in Fig. 5, the ends of the ring 22 include keeper portions or fingers 23 which extend transversely across the upper and lower ends of the slot 20 adjacent the ends of the passage 19. The major portion of the keeper ring 22 intermediate the fingers 23 is secured to the body portion of the bobber 10 with the ends of the finger portions 23 being spaced slightly from the surface of the bobber 10 as best shown in Fig. 2. Thus, in installing the bobber 10 on the fishing line 11, the line 11 is passed through the slot 20 and beneath the keeper fingers 23 into the passage 19 where it is retained during normal fishing operation by the keeper fingers 23.

If it should be desirable to anchor the bobber 10 in a particular position on the line 11, line 11 after being positioned in the passage 19 could easily be looped around the keeper fingers 23 at each end of the bobber 10 to substantially prevent relative movement between the line 11 and the bobber 10.

Means are also provided in the bobber 10 of this invention to permit a fisherman to regulate or control the depth of his bait from a boat or from the shore without manual manipulation of the bobber by merely moving the end of the rod. To provide this means for adjusting the depth of the bait, a conical recess 25 is formed at each end of the passage 19 extending through the bobber 10 with the large ends of the conical recesses 25 opening toward each other and toward a further enlarged central portion 26 of the passage 19 having inclined shoulders 27 leading to the large ends of the conical recesses 25. A bearing control ball 28 is disposed in the passage 19 and is adapted to be seated in one of the conical recesses 25 when the bobber 10 is in a vertical position, as shown in Fig. 3, whereupon the line 11 is locked against movement relative to the bobber 10. Upon movement of the rod, sufficient to tilt the bobber 10, as shown in Fig. 4, the ball 28 rolls into the enlarged portion 26 of the passage 19 where it is supported on the shoulders 27, thus permitting free movement of the line 11 through the bobber 10.

It is noted in Figs. 3 and 4 that the axes of the conical recesses 25 are angularly displaced relative to the axis of the body portion of the bobber 10 so that the surfaces of the conical recesses 25 furthest from the slot 20 extend along the axis of the body portion of the bobber 10. This arrangement of the conical recesses 25 permits the line 11 to take a straight course through the bobber 10 and thus requires less sinker weight to draw the bait down to the desired depth.

In casting, the ball 28 may be disposed in either of the conical recesses 25 whereupon the bobber 10 is locked relative to the line 11. After the bobber 10 has struck the water, the fisherman by merely tipping the bobber 10 by shifting his pole may unlock the ball 28, Fig. 4, and permit the bait to sink to the desired depth. The bobber 10 is then permitted to right itself whereupon the ball 28 rolls off of the inclined shoulder 27 into one of the conical recesses 25, Fig. 3, and the line 11 is locked at the desired depth. After a fish is caught on the hook 16, the fisherman may again tilt the bobber 10 and reel the line 11 therethrough until the hook 16 (or sinker 15, if one is used) is adjacent the bobber 10 whereupon the fish may be netted relatively close to the end of the rod 12.

With the bobber 10 disclosed herein, it is believed evident that it may be used either with the red half 17 uppermost or the white half 18 uppermost as the ball 28 may seat itself in either of the recesses 25 to lock the line 11 relative to the bobber 10. Thus, it is evident that a fisherman who wished to fish during the daytime with the red half of the bobber 10 uppermost could easily remove the bobber 10 from the line 11, invert it, and replace it on the line 11 with the white half uppermost after it becomes dark without having to first remove the sinker 15 and the baited hook 16 from the line 11.

The bobber disclosed herein is very economical and simple to produce as it is composed of only four parts; the two halves of the body portion, the ball, and the keeper ring.

We claim:
1. A fishing bobber comprising: a spherical body portion made of a floatable material; means defining a through passage extending along the vertical axis of said body portion when floating in a body of liquid; means defining a vertical slot in said body portion extending from the outer surface thereof into said passage; means in the two end portions of said passage defining conical recesses with their larger ends opening toward each other, the central portion of said passage being enlarged with inclined shoulders intersecting said larger ends of said conical recesses, said vertical slot opening into said conical recesses and said enlarged central portion of said passage, the axes of said conical recesses being disposed angularly with respect to the axis of said spherical body portion with the surfaces of said conical recesses furthest from said slot extending along the vertical axis of said spherical body portion; a substantially semi-cylindrical keeper ring disposed vertically on said spherical body portion and normally to said slot, said keeper ring having the portion intermediate its ends secured to said body portion and having its ends spaced slightly from said body portion and extending across the upper and lower ends of said slot adjacent the upper and lower ends of said passage, said keeper ring permitting a fishing line to be passed through said slot and past the ends of the ring into said passage with the fishing line then being retained within said passage during normal fishing operation by said keeper ring; and a ball in said passage adapted to seat itself in one of said conical recesses against the fishing line when said body portion is in a vertical position to prevent movement of said line relative to said body portion in one direction and adapted to be disposed on said shoulder in said enlarged central portion of the passage when the body portion is in an inclined position to permit free movement of said fishing line relative to said body portion.

2. A fishing bobber comprising: a body portion made of a floatable material; means defining a through passage extending along the vertical axis of said body portion when floating in a body of liquid and adapted to receive a fishing line; means in the two end portions of said passage defining conical recesses with their larger ends opening toward each other, the central portion of said passage being enlarged with inclined shoulders intersecting said larger ends of said conical recesses, and the axes of said conical recesses being angularly displaced with respect to the axis of said body portion so that a portion of the surfaces of said conical recesses extends along the axis of said body portion; and a ball in said passage adapted to seat itself in one of said conical recesses against the fishing line when said body portion is in a vertical position to prevent movement of the line relative to said body portion in one direction and adapted to be disposed on said shoulder in said enlarged central portion of the passage when the body portion is in an inclined position to permit free movement of said fishing line relative to said body portion.

References Cited in the file of this patent

UNITED STATES PATENTS

| 326,134 | McNeal | Sept. 15, 1885 |
| 528,123 | Morrison | May 20, 1890 |
| 2,143,942 | Gruenhagen | Jan. 17, 1939 |
| 2,326,510 | Worden | Aug. 10, 1943 |
| 2,579,713 | Tolle | Dec. 25, 1951 |
| 2,593,728 | Carpenter | Apr. 22, 1952 |
| 2,627,691 | Bress | Feb. 10, 1953 |
| 2,654,177 | Cope et al. | Oct. 6, 1953 |
| 2,683,325 | Sharp | July 13, 1954 |

FOREIGN PATENTS

| 570,752 | France | 1924 |